(12) United States Patent
Kombowski

(10) Patent No.: US 8,597,130 B2
(45) Date of Patent: Dec. 3, 2013

(54) FORCE TRANSMISSION FLANGE FOR A TORQUE TRANSMISSION DEVICE OR A DAMPER DEVICE, AND TORQUE TRANSMISSION DEVICE OR DAMPER DEVICE

(75) Inventor: Eugen Kombowski, Malsch (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 13/606,659

(22) Filed: Sep. 7, 2012

(65) Prior Publication Data

US 2012/0329563 A1 Dec. 27, 2012

Related U.S. Application Data

(63) Continuation of application No. PCT/DE2011/000173, filed on Feb. 21, 2011.

(30) Foreign Application Priority Data

Mar. 11, 2010 (DE) .......................... 10 2010 011 138
Aug. 19, 2010 (DE) .......................... 10 2010 034 805

(51) Int. Cl.
    *F16F 15/123* (2006.01)
(52) U.S. Cl.
    USPC ........................................ 464/68.7; 464/68.8
(58) Field of Classification Search
    USPC ............... 464/62.1, 68.7, 68.8; 192/3.29, 3.3, 192/30 V, 70.17, 204, 213.11, 213.12, 192/213.21–214.1
    See application file for complete search history.

(56) References Cited

U.S. PATENT DOCUMENTS 5,813,506 A * 9/1998 Maeda et al. ................ 192/3.29
6,695,110 B2 * 2/2004 Maienschein et al. ......... 192/3.3
8,047,922 B2 * 11/2011 Maienschein ................ 464/68.8

FOREIGN PATENT DOCUMENTS

| DE | 102008031956 | | 2/2009 |
|---|---|---|---|
| DE | 102008032459 | * | 2/2009 |
| GB | 2281767 | | 3/1995 |
| JP | 8068452 | | 3/1996 |
| JP | 08068452 | * | 3/1996 |
| JP | 2009156270 | * | 7/2009 |
| JP | 2010007717 | | 1/2010 |
| WO | WO 2009067988 | * | 6/2009 |
| WO | WO 2009147986 | * | 12/2009 |

* cited by examiner

*Primary Examiner* — Gregory Binda
*Assistant Examiner* — Josh Skroupa
(74) *Attorney, Agent, or Firm* — Simpson & Simpson, PLLC

(57) ABSTRACT

A force transmission flange, preferably an intermediate force transmission flange, for a torque transmission device or a damper device, in particular for a drivetrain of a motor vehicle, wherein the force transmission flange has driver devices for mechanically coupling energy storage elements, and for at least two energy storage elements arranged offset axially and/or radially with respect to each other, the force transmission flange has at least two driver devices which are formed as one piece of the same material with the force transmission flange and are for coupling the energy storage elements. The invention relates to a device such as a torque converter, Föttinger coupling, damper, torsional vibration damper, turbine damper, pump damper, dual-mass converter or dual-mass flywheel or a combination thereof, optionally with a centrifugal pendulum-type absorber, wherein the device has a force transmission flange, especially an intermediate force transmission flange.

23 Claims, 2 Drawing Sheets

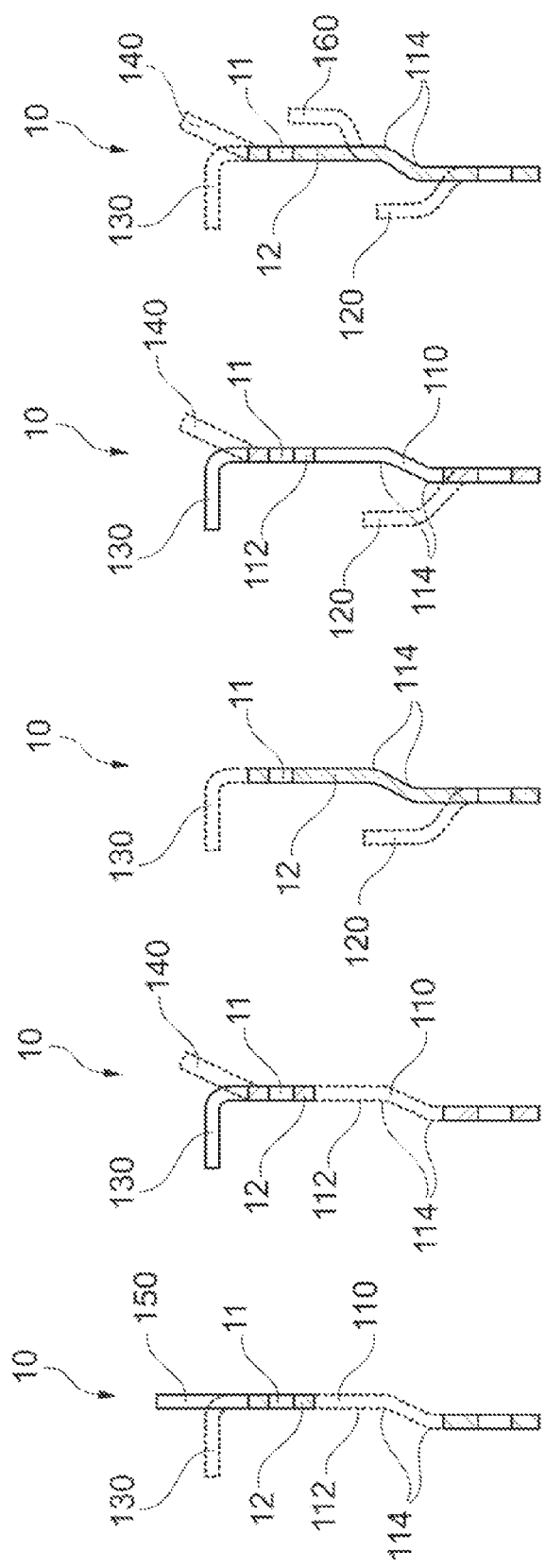

FORCE TRANSMISSION FLANGE FOR A TORQUE TRANSMISSION DEVICE OR A DAMPER DEVICE, AND TORQUE TRANSMISSION DEVICE OR DAMPER DEVICE

CROSS-REFERENCE TO RELATED APPLICATIONS

This application is filed under 35 U.S.C. 111(a) as a continuation of International Patent Application No. PCT/DE2011/000173 filed Feb. 21, 2011 and claiming priority of German Patent Application No. 10 2010 011 138.4 filed Mar. 11, 2010 and German Patent Application No. 10 2010 034 805.8 filed Aug. 19, 2010, which applications are incorporated herein by reference in their entireties.

FIELD OF THE INVENTION

The present invention relates to a force transmission device, preferably an intermediate force transmission flange, for a torque transmission device or a damper device, in particular, for a drivetrain of a motor vehicle, wherein the force transmission flange has driver devices for mechanically coupling energy storage elements. In addition, the invention relates to a torque transmission device or a damper device having a force transmission flange according to the invention, especially an intermediate force transmission flange according to the invention.

BACKGROUND OF THE INVENTION

Torque transmission devices for use in drivetrains of motor vehicles with automatic transmissions generally comprise a hydrodynamic component and a shiftable clutch device for bridging this component, wherein the motor vehicle is operated over a majority of its operating range with an engaged locking clutch. To dampen the vibrations introduced into the drivetrain by irregular rotation in an internal combustion engine of the motor vehicle, a device for damping vibrations is inserted before and/or after the locking clutch in the flow of force. Such a device can be designed in various ways. Preferably, it is a damping device with at least one damper stage, wherein means are provided for transmitting torque and coupling the damper to mechanical transmission elements, especially energy storage elements.

In addition, torsional vibration dampers as well as damper devices are inserted in drivetrains of motor vehicles with a shift transmission between the internal combustion engine and transmission. For example, such torsional vibration dampers can be implemented in clutch discs of friction clutches or designed as dual-mass flywheels. In particular, when energy storage elements are used in the form of helical springs such as bow springs, multipart force transmission flanges are used that have radially extending flange tabs and apply the drive force of the internal combustion engine to the helical springs in a peripheral direction. The flange tabs are mainly firmly mechanically connected individually to the relevant force transmission flange by means of a rivet connection. That is, the force is conducted from the force transmission flange via the rivet connection of the flange tabs, and from these to the bow springs, or vice versa.

Another problem associated with the torsional vibration introduced into the drivetrain of the motor vehicle is that, for reasons of energy efficiency, an attempt is presently being made to reduce the overall number of cylinders in individual internal combustion engines, and 2 to 3-cylinder internal combustion engines are being developed. However, the uneven running of the drivetrain is increased when the number of cylinders in the internal combustion engine is reduced. As the uneven running of the drivetrain increases, torsional vibration dampers, such as dual-mass flywheels or turbine dampers have to be re-dimensioned, since only a small installation space is available in small and medium-sized vehicles.

The requirements for torsional vibration dampers as well as torque transmission devices have accordingly increased, but there is no more available installation space. In particular, there is less installation space available in an axial direction, which restricts the design of torsional vibration dampers or torque transmission devices. This particularly holds true when, for example, parallel dampers or multiple dampers are to be arranged in the axial direction of the drivetrain. In addition, the cost of realizing a multipart force transmission flange is comparatively high, especially for axially offset damper arrangements, and additional installation space is required, particularly axial installation space, i.e., lying in the direction of the rotational axis, for the rivet connections of flange tabs and the actual main body of the force transmission flange.

BRIEF SUMMARY OF THE INVENTION

The force transmission flange according to the invention, or the intermediate force transmission flange according to the invention for a torque transmission device or a damper device in particular for a drivetrain of a motor vehicle, has driver devices for mechanically coupling energy storage elements, wherein for at least two energy storage elements arranged offset axially and/or radially with respect to each other, the force transmission flange or the intermediate force transmission flange has at least two driver devices which are formed as one piece of the same material with the force transmission flange or the intermediate force transmission flange and are used to couple the energy storage elements. In the following, chiefly a force transmission flange will be addressed which includes the concept of an immediate force transmission flange.

The force transmission flange according to the invention has at least two integral driver devices, wherein a first driver device is assignable to a first energy storage element that has a different task, such as a different damper task, than a second energy storage element in, for example, a torque transmission device or damper device. The second driver device of the force transmission flange is assigned to the second energy storage element, wherein the two driver devices can generally assume a different radial or axial position on or in the force transmission flange. Depending on the tasks of the energy storage elements, a plurality of energy storage elements and correspondingly a plurality of driver devices can of course be provided, for example per damper stage.

The force transmission flange according to the invention can be used to realize a single-part, economical force transmission flange that saves installation space for a damper system, such as a torque transmission device or a damper device, especially with spring elements, that are energy storage elements. The spring elements can, for example, be arranged in an axial direction in two planes, wherein the spring elements can, in particular, lie on both sides of the force transmission flange, or preferably one of the spring elements can lie mainly in the flange plane, and the other spring element is axially offset from the first. Furthermore, the spring elements can be arranged radially offset on a single effective radius of the force transmission flange, or in addition to the axial offset. In addition, only one radial offset of the spring elements can be used. As indicated above, a plurality of spring elements that have a common task can be correspondingly combined into a single spring or damper stage.

According to the invention, a useful force transmission flange can be made from a single component blank, wherein the force transmission flange can be preferably stamped from sheet metal, and at least some of the driver devices can be bent out of a plane of the sheet metal in a connection thereto. It is, however, also possible to use an inner wall of the flange as a driver device instead of a flange tab that is bent outward; this is particularly useful when the driver devices are radially offset. The useful force transmission flange can only be disassembled into two parts by at least partially destroying its structure so that it is not easy to functionally reassemble it.

The force transmission flange preferably consists of a single flat, comparatively thin material layer. Some of the driver devices, or all of the driver devices, can be bent out of the plane of the material layer that basically forms the main body of the force transmission flange. It is, however, also possible to exclusively use driver devices that consist of inner flange walls of cutouts in the main body of the force transmission flange, optionally in combination with one or a plurality of inner or outer flange tabs that optionally can be partially arranged parallel to the plane of the main body (see below).

In the embodiments of the invention, a driver device is an inner flange wall of a cutout in the main body of the force transmission flange. In addition, a driver device can be an inner flange tab of the main body at a distance from the plane of the main body and preferably partially extends parallel to the main body. Furthermore, a driver device can be an outer flange tab of the main body that preferably lies in the plane of the main body, or partially parallel thereto. In addition, a driver device can be an outer flange tab of the main body that is arranged at an angle relative to the main body. In principle, this angle can be as desired; however, an essentially 90° or 45° angle is preferred if the available space permits.

In preferred embodiments of the invention, the force transmission flange has at least one driver device for at least one main damper of the torque transmission device or the damper device, wherein the driver device is at least partially arranged in the plane of the main body, and/or at least partially parallel to the plane of the main body, and/or at an angle of approximately 90° to the plane of the main body. In addition, the force transmission flange can have a driver device for an additional damper of the torque transmission device or the damper device, wherein the driver device is preferably an outer flange tab of the main body that is arranged at an angle relative to the main body, especially at a 45° angle.

It is an object of the invention to present an improved force transmission flange, especially an improved intermediate force transmission flange, for a torque transmission device and/or a damper device, and an improved torque transmission device and/or an improved damper device for a drivetrain of a motor vehicle. A relevant force transmission flange can be used with a flexible design and in a space-saving manner in or on a torque transmission device and/or a damper device, wherein parallel and/or multiple damper arrangements are feasible by means of the force transmission flange. In addition, the force transmission flange is economic to manufacture.

The object of the invention is achieved with a force transmission flange, especially an intermediate force transmission flange, for a torque transmission device or a damper device, especially for a drivetrain of a motor vehicle, and a torque transmission device or a damper device such as a torque converter, a Föttinger coupling, a damper, a torsional vibration damper, a turbine damper, a pump damper, a dual-mass converter or dual-mass flywheel or a combination thereof, optionally with a centrifugal pendulum-type absorber. Advantageous embodiments of the invention are found in the respective dependent claims.

BRIEF DESCRIPTION OF THE DRAWINGS

The invention will be further explained in the following with reference to exemplary embodiments associated with the accompanying drawings. The figures show the following:

FIG. 1 is a radial half-section of an embodiment of the invention showing three driver devices; an inner flange wall, an outer flange tab arranged at a 90° angle, and an outer flange tab preferably arranged in the plane of the main body;

FIG. 2 is a radial half-section of an embodiment of the invention showing three driver devices; an inner flange wall, an outer flange tab (both as shown in FIG. 1), and an outer flange tab preferably arranged basically at a 45° angle to the main body;

FIG. 3 is a radial half-section of an embodiment of the invention showing two driver devices; an outer flange tab arranged at a 90° angle and an inner flange tab preferably lying partially parallel to the main body wherein the root of the inner flange tab is arranged in a bottom area of the driver device;

FIG. 4 is a radial half-section of an embodiment of the invention showing four driver devices; an inner flange wall (as shown in FIGS. 1 and 2), an inner flange tab preferably lying partially parallel to the main body arranged in a bottom area (as shown in FIG. 3), an outer flange tab arranged at a 90° angle (as shown in FIGS. 1, 2, and 3), and an outer flange tab preferably arranged basically at a 45° angle to the main body (as shown in FIG. 2);

FIG. 5 is a radial half-section of an embodiment of the invention showing four driver devices; (as shown in FIG. 3) an outer flange tab arranged at a 90° angle and an inner flange tab preferably lying partially parallel to the main body wherein the root of the inner flange tab is arranged in a bottom area of the driver device, an outer flange tab preferably arranged basically at a 45° angle to the main body (as shown in FIG. 2), and an additional inner flange tab arranged on the opposite side of the main body and radially from the first flange tab; and, FIG. 6 is a torque transmission device according to the invention or a damper device according to the invention.

DETAILED DESCRIPTION OF THE INVENTION

Figure 6:
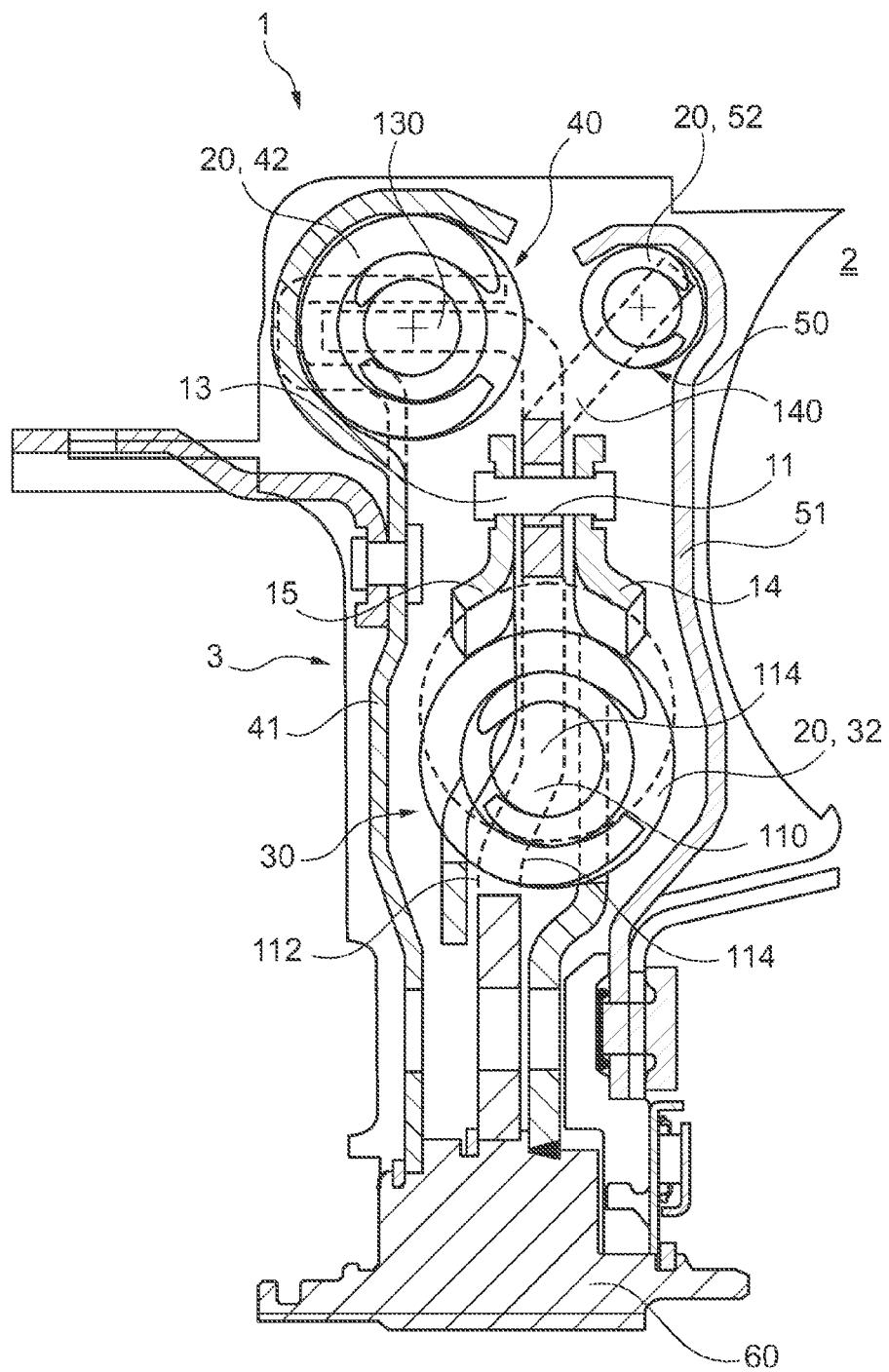

FIGS. 1 to 5 show an example of a plurality of embodiments of force transmission flanges 10 according to the invention for a torque transmission device 1 or a damper device 1 (see FIG. 6). Such a torque transmission device 1 according to the invention can, for example, be a torque converter or a Föttinger coupling. In addition, such a damper device according to the invention can be a general damper, a torsional vibration damper, a turbine damper, pump damper, dual-mass converter, dual-mass flywheel or a combination thereof, wherein, for example, such a damper device can be a component of a torque converter (see also FIG. 6) or a Föttinger coupling.

Moreover, the damper device 1 itself can be termed a torque transmission device 1 since it can be used to transmit the entire torque to be transferred into a drivetrain of a motor vehicle. The relevant torque transmission flange 10 can comprise devices such as through-holes for fixing one or a plurality of centrifugal pendulum-type absorbers (not shown in the drawing). The through-holes can, for example, be designed as slots that force the centrifugal pendulum-type absorbers along a specific path of movement.

The force transmission flange 10 is preferably designed as a force transmission flange 10 that is connectable to at least one but preferably two cover plates 14, 15 by means of a rivet 13 (see FIG. 6). The force transmission flange has at least two driver devices 110, 120, 130, 140, 150 for mechanically coupling energy storage elements 20; 32, 42, 52. The force transmission flange 10 can have any mereological number of one or a plurality of driver devices 110, 120, 130, 140, 150.

The energy storage elements 20, 32, 42, 52 that are preferably designed as curved helical springs 20, 32, 42, 52 assume damping tasks between the force transmission flange 10 and one or a plurality of driver discs 41 and/or one or a plurality of additional damping discs 51. A plate carrier 43, especially a plate carrier 43 for a lock-up clutch (not shown in the drawing) of a converter that is designed in the example in FIG. 6 as a torque converter 1 (only partially shown in the drawing) is preferably provided on a driver disk 41. The damper device 1 shown in FIG. 6 forms a turbine damper of a turbine 2 of the torque converter 1.

The torque of an internal combustion engine to be introduced in the damper device 1 passes via the additional damping disc 51 or the driver disk 41, depending on whether the lock-up clutch is disengaged or engaged, through the relevant energy storage elements 20; 42, 52 into the force transmission flange 10 and from there via the energy storage elements 20, 32 into the cover plate 14 on the right. The cover plate 14 on the right is connected via a solid connection, especially a weld connection, to a damper hub 60 of the damper device 1 that is preferably connected via a spline in a mechanically non-rotating manner to a transmission input shaft of an automatic transmission of the motor vehicle (not shown in the drawing), thus causing the transmission input shaft to execute a rotational movement about a rotational axis R that is dampened relative to an output shaft of the internal combustion engine.

The embodiment shown in FIG. 6 of the force transmission flange 10 that corresponds to the one in FIG. 2 is of course not the only embodiment of the invention. Depending on the use of the damper device 1, the force transmission flange 10 and hence also the damper device 1 can be designed differently (see above). A plurality of applications of one or more damper devices 1 is, for example, disclosed in DE 10 2008 031 956 A1. The force transmission flange 10 according to the invention can, for example, be used on the damper identified with reference numbers 12 and 15 in FIG. 1 to 32 of this document. The invention can also be used in drivetrains of motor vehicles with shift transmissions. In addition, the invention can be used wherever torsional vibrations need to be dampened.

In general, the force transmission flange 10 according to the invention is designed as a single piece of the same material with its relevant driver devices 110, 120, 130, 140, 150. Not all the driver devices 120, 130, 140, 150 need to be provided in one piece of the same material with the force transmission flange 10; it is possible to provide other driver devices 120, 130, 140, 150 in addition to the driver devices 110, 120, 130, 140, 150, for example by means of rivet connections. According to the invention, a single force transmission flange 10 has, however, at least two driver devices 110, 110; 120, 120; 130, 130; 140, 140; 150, 150; 110, 120; 110, 130; 110, 140; 110, 150; 120, 130; 120, 140; 120, 150; 130, 140; 130, 150; 140, 150 such that at least two damper stages in one damper device 1 can be realized. That is, at least two driver devices 110, 120, 130, 140, 150 of the force transmission flange 10 are provided which are offset axially, radially or axially/radially relative to each other on the force transmission flange 10.

A single part design of the same material means that the relevant force transmission flange is made of a single workpiece such as a punched blank of sheet metal, that is, it preferably consists of a single material layer that is optionally reworked, especially partially bent. In particular, a single part design of the same material does not mean welding or any other type of joining such as gluing, riveting, screwing, etc.; that is, the force transmission flange 10 according to the invention consists of a structure that cannot be easily disassembled without destroying its internal structure and hence cannot be easily reassembled.

According to the invention, the force transmission flange 10 has at least two driver devices 110, 120, 130, 140, 150 that are formed as a single part of the same material with the main body 12 of the force transmission flange 10. According to the invention, of course at least three or at least four driver devices 110, 120, 130, 140, 150 can be designed as a single piece of the same material with the force transmission flange 10. The driver devices 110, 120, 130, 140, 150 are designed such that they allow movement to be transmitted from the force transmission flange 10 to an energy storage element 20; 32, 42, 52, or from an energy storage element 20; 32, 42, 52 to the force transmission flange 10. Preferred embodiments of driver devices 110, 120, 130, 140, 150 will be presented in the following.

It is accordingly possible, for example, to design a driver device 110 as an inner flange wall 110 of the force transmission flange 10. The force transmission flange 10 preferably has a recess 112 in the main body 12 which is a margin of the inner flange wall 110. In addition, for reasons of stability, it is preferable for the inner flange wall 110 to have a curve 114. Furthermore, it is possible to design a driver device 120 as an inner flange tab 120 or an inner offset 120. The driver device 120 is preferably bent out of the plane of the main body 12, and a section, preferably a longitudinal end section, lies parallel to the main body 12. An angled arrangement of the driver device 120 relative to the main body 12 can of course also be used. The driver device 120 is notched from a window in the main body 12.

It is also possible to design a driver device 130, 140 as an outer flange tab 130, 140 or an outer offset 130, 140, wherein the outer flange tab 130, 140 can lie at an angle relative to the main body 12 of the force transmission flange 10. Any angle can be used as well as sections that lie parallel to the main body 12. The driver device 140 preferably has an angle of approximately 45°, and the driver device 130 has an angle of approximately 90°. Moreover, a driver device 150 can be provided that projects substantially radially from the main body 12 as an outer flange tab 150. The outer flange tab 150 can also be offset to the main body 12. That is, the driver devices 130, 140, 150 form projections on an outer diameter of the main body 12. Driver devices 130, 140 that lie further inward on the main body 12 can also be provided.

In particular, FIG. 1 shows three driver devices 110, 130, 150, wherein the driver device 110 is designed as an inner flange wall 110 of the force transmission flange 10 that also has a curve 114 in the portrayed half section (rotational axis R). In addition, FIG. 1 discloses two outer flange tabs 130, 150 on the periphery of the main body 12, wherein the outer flange 130 lies at a 90° angle relative to the main body 12, and the outer flange tab 150 projects radially from the main body 12. FIG. 2 shows three driver devices 110, 130, 140, wherein in comparison to FIG. 1, an outer flange tab 140 arranged at an approximately 45° angle relative to the main body 12 is used instead of a radially projecting outer flange tab 150. Furthermore, in addition to FIG. 2, FIG. 4 shows a fourth driver device 120 that is designed as an inner flange tab 120, wherein a root of the inner flange tab 120 can be arranged in a bottom area, preferably radially offset to the driver device 110.

Furthermore, FIG. 3 shows two driver devices 120, 130, wherein the driver device 120 is designed like the inner flange tab 120 in FIG. 4, and driver device 130 is designed like the outer flange tab 130 in FIG. 1. In addition to FIG. 3, FIG. 5 shows two additional driver devices 120, 140, wherein the driver device 140 is designed like the outer flange tab 140 in FIG. 2. Moreover, the embodiment of the force transmission flange 10 in FIG. 5 has a second inner flange tab 160 that is arranged on a side of the main body 12 opposite the first flange tab 120 and preferably radially offset to the first flange tab 120. With all the conceivable embodiments of the invention, it is of course possible to use a plurality of individual driver devices 110, 120, 130, 140, 150, or 160 for each damper stage. This depends on the number of used energy storage elements 20; 32, 42, 52, where an individual driver device 110, 120, 130, 140, 150, or 160 is provided for each energy storage element 20; 32, 42, 52.

The invention can be used in particular for complex damper devices 1 where energy storage elements 20; 32, 42, 52 can be used on one or more radii and/or in one or more axial planes to realize economical solutions of force transmission flanges 10, or intermediate force transmission flanges 10, that save installation space. The employed energy storage elements 20; 32, 42, 52 are preferably axially offset on the force transmission flange 10, particularly arranged opposite the main body 12 and/or preferably radially offset. In addition, it is possible to provide a flange tab 150 on an outer diameter of the main body 12 for an energy storage element 20 lying further to the outside in addition to an energy storage element 20; 32 (driver device 110) articulated in the force transmission flange 10. The exclusive combination is not shown in the drawing; it would correspond to an embodiment of the force transmission flange 10 according to FIG. 1 without the outer flange tab 130.

REFERENCE NUMERALS

1 Torque transmission device, damper device such as a torque converter, Föttinger coupling, damper, torsional vibration damper, turbine damper, pump damper, dual-mass converter or dual-mass flywheel or a combination thereof, optionally with a centrifugal pendulum-type absorber
2 Turbine
10 Force transmission flange, intermediate force transmission flange
11 Through-hole for rivet
12 Main body
13 Rivet
14 Cover plate
15 Cover plate
20 Energy storage element, preferably helical spring
30 Main damper
32 Energy storage element of main damper 30, preferably helical spring
40 Main damper
41 Driver disk
42 Energy storage element of main damper 40, preferably helical spring
43 Plate carrier
50 Additional damper
51 Additional damping disc
52 Energy storage element of additional damper 50, preferably helical spring
60 Damper hub
110 Driver device, especially the inner flange wall of the force transmission flange 10
112 Recess in main body 12
114 Curve
120 Driver device, offset; especially inner flange tab, preferably lying partially parallel to the main body 12
130 Driver device, offset; especially outer flange tab, preferably arranged basically at a right angle to the main body 12
140 Driver device, offset; especially outer flange tab, preferably arranged basically at a 45° angle to the main body 12
150 Driver device, offset; especially outer flange tab, preferably arranged in the plane of the main body 12
160 Driver device, offset
R Rotational axis of the torque transmission device 1 as well as a crankshaft and a transmission input shaft

What is claimed is:

1. A force transmission flange (10), comprising:
a single flat, material layer;
a plurality of driver devices including first, second, and third driver devices for mechanically coupling first, second, and third energy storage elements, respectively, wherein:
the first and second energy storage elements are located radially outward of the third energy storage element and are at least partially aligned with each other in a direction parallel to an axis of rotation for the flange,
the plurality of driver devices is formed as one piece of the same material with the force transmission flange (10); and,
at least one driver device from the plurality of driver devices is bent out of a plane of said material layer.

2. The force transmission flange recited in claim 1, wherein said force transmission flange (10) is an intermediate force transmission flange (10) for a torque transmission device (1) or a damper device (1).

3. The force transmission flange recited in claim 1, wherein the force transmission flange (10) is manufactured from a single component blank.

4. The force transmission flange recited in claim 1, wherein the force transmission flange (10) is stamped from sheet metal.

5. The force transmission flange recited in claim 4, wherein the plurality of driver devices is bent out of a plane of said sheet metal.

6. The force transmission flange recited in claim 1, wherein the force transmission flange (10) is configured to be disassembled into two parts and wherein the force transmission flange (10) is at least partially destroyed during disassembly.

7. The force transmission flange recited in claim 1, wherein the third driver device includes an inner flange wall of a recess in a main body (12) of the force transmission flange (10).

8. The force transmission flange recited in claim 1, wherein the plurality of driver devices comprises a fourth driver device having an inner flange tab of a main body (12) at a distance from a plane of the main body (12).

9. The force transmission flange recited in claim 8, wherein at least a portion of said fourth driver device is arranged parallel to the main body (12) of the force transmission flange (10).

10. The force transmission flange recited in claim 1, wherein the plurality of driver devices comprises a fourth driver device, said third driver device is an inner flange wall of a recess in a main body (12) of the force transmission flange (10) and said fourth driver device is an inner flange tab of the main body (12) at a distance from a plane of the main body (12).

11. The force transmission flange recited in claim 10, wherein at least a portion of said fourth driver device is arranged parallel to the main body (12) of the force transmission flange (10).

12. The force transmission flange recited in claim 1, wherein the plurality of driver devices comprises at least two of a first outer flange tab of a main body (12), or second or third outer flange tabs of the main body (12) arranged at first and second angles, respectively, relative to the main body (12).

13. The force transmission flange recited in claim 12, wherein said first angle is approximately 90° and said second angle is approximately 45°.

14. The force transmission flange recited in claim 12, wherein said first outer flange tab is arranged in a plane of the main body (12) of the force transmission flange (10).

15. The force transmission flange recited in claim 1, wherein:
the plurality of driver devices includes a fourth driver device;
the plurality of damper devices includes at least one main damper (30, 40) of a torque transmission device (1) or damper device (1);
a portion of each of said third driver devices is arranged in a plane of a main body (12);
a portion of said fourth driver device is arranged parallel to the plane of the main body (12);
said first driver device is arranged at approximately a 90° angle relative to the plane of the main body (12);
and said second driver device (140) is arranged at approximately a 45° angle relative to the plane of the main body (12).

16. The force transmission flange recited in claim 1, wherein the second driver device is for an additional damper (50) and said second driver device is an outer flange tab of a main body (12) and arranged at an angle relative to the main body (12).

17. The force transmission flange recited in claim 16, wherein said second driver device (140) is arranged at approximately a 45° angle.

18. The force transmission flange recited in claim 1, wherein the force transmission flange (10) comprises at least four driver devices.

19. A drivetrain of a motor vehicle comprising the force transmission flange (10) recited in claim 1.

20. A torque transmission device (1) or damper device (1) comprising the force transmission flange (10) of claim 1.

21. The torque transmission device (1) or damper device (1) recited in claim 20 wherein said force transmission flange (10) is an intermediate force transmission flange (10).

22. A torque transmission device, comprising:
a turbine;
first, second, and third energy storage elements;
a force transmission flange including first, second, and third driver devices directly engaged with first, second, and third energy storage elements, respectively;
a driver disc directly engaged with the first energy storage element and arranged to transmit first torque to the first energy storage element; and,
a damping disc fixedly connected to the turbine, directly engaged with the second energy storage element, and arranged to transmit torque from the turbine to the second energy storage element, wherein:
the first and second energy storage devices are at least partially axially aligned with each other;
the first and second energy storage devices are radially outward of the third energy storage device; and,
the first, second, and third driver devices are rotationally locked.

23. A force transmission flange, comprising:
a plurality of driver devices including first, second, and third driver devices for mechanically coupling first, second, and third energy storage elements, respectively, wherein:
the first and second energy storage elements are located radially outward of the third energy storage element and are at least partially aligned with each other in a direction parallel to an axis of rotation for the flange,
the plurality of driver devices is formed as one piece of the same material with the force transmission flange; and,
the plurality of driver devices comprises a fourth driver device having an inner flange tab of a main body at a distance from a plane of the main body.

* * * * *